United States Patent [19]

Stalder

[11] 4,340,245
[45] Jul. 20, 1982

[54] INSULATED PRESTRESSED CONDUIT STRING FOR HEATED FLUIDS

[75] Inventor: John L. Stalder, Ventura, Calif.

[73] Assignee: Conoco Inc., Ponca City, Okla.

[21] Appl. No.: 171,765

[22] Filed: Jul. 24, 1980

[51] Int. Cl.³ .............................................. F16L 59/16
[52] U.S. Cl. ...................................... 285/53; 138/149
[58] Field of Search ................. 285/47, 53, DIG. 5, 285/133 A; 138/149

[56] References Cited

U.S. PATENT DOCUMENTS

| | | | |
|---|---|---|---|
| 1,140,633 | 5/1915 | Trucano | 285/47 |
| 3,275,345 | 9/1966 | Waldron et al. | 285/47 |
| 3,369,826 | 2/1968 | Boosey et al. | 285/47 |
| 3,371,946 | 3/1968 | Bleyle, Jr. et al. | 285/47 |
| 3,511,282 | 5/1970 | Willhite et al. | 166/303 X |
| 3,574,357 | 4/1971 | Alexandru | 285/47 |
| 4,025,091 | 5/1977 | Zeile, Jr. | 285/53 |
| 4,130,301 | 12/1978 | Dunham et al. | 285/47 |

*Primary Examiner*—Thomas F. Callaghan
*Attorney, Agent, or Firm*—A. Joe Reinert

[57] ABSTRACT

An improved prestressed conduit string for conducting heated fluids through a well bore comprised of a plurality of concentric double wall tube conduit sections each including an inner heated fluid conductor tube in tension prestress and a larger diameter outer tube in compression prestress to reduce heat transfer from the conducted fluids and prevent deformation of the conduit string when heated. By the present invention, the outer tubes of the conduit sections are shorter than the conductor tubes thereof whereby the ends of the conductor tubes extend short equal distances beyond the ends of the outer tubes. Connector means for connecting the conduit sections together in end-to-end relationship thereby forming the conduit string are comprised of annular resilient seal means positioned around axially aligned adjacent extending ends of the conductor tubes of adjacent conduit sections and coupling means positioned around the seal means and connected to the outer tubes of adjacent conduit sections thereby rigidly connecting the sections together and compressing the seal means against the sides of the adjacent extending ends of the conductor tubes and forming a sealed heat insulated joint between the conduit sections.

10 Claims, 3 Drawing Figures

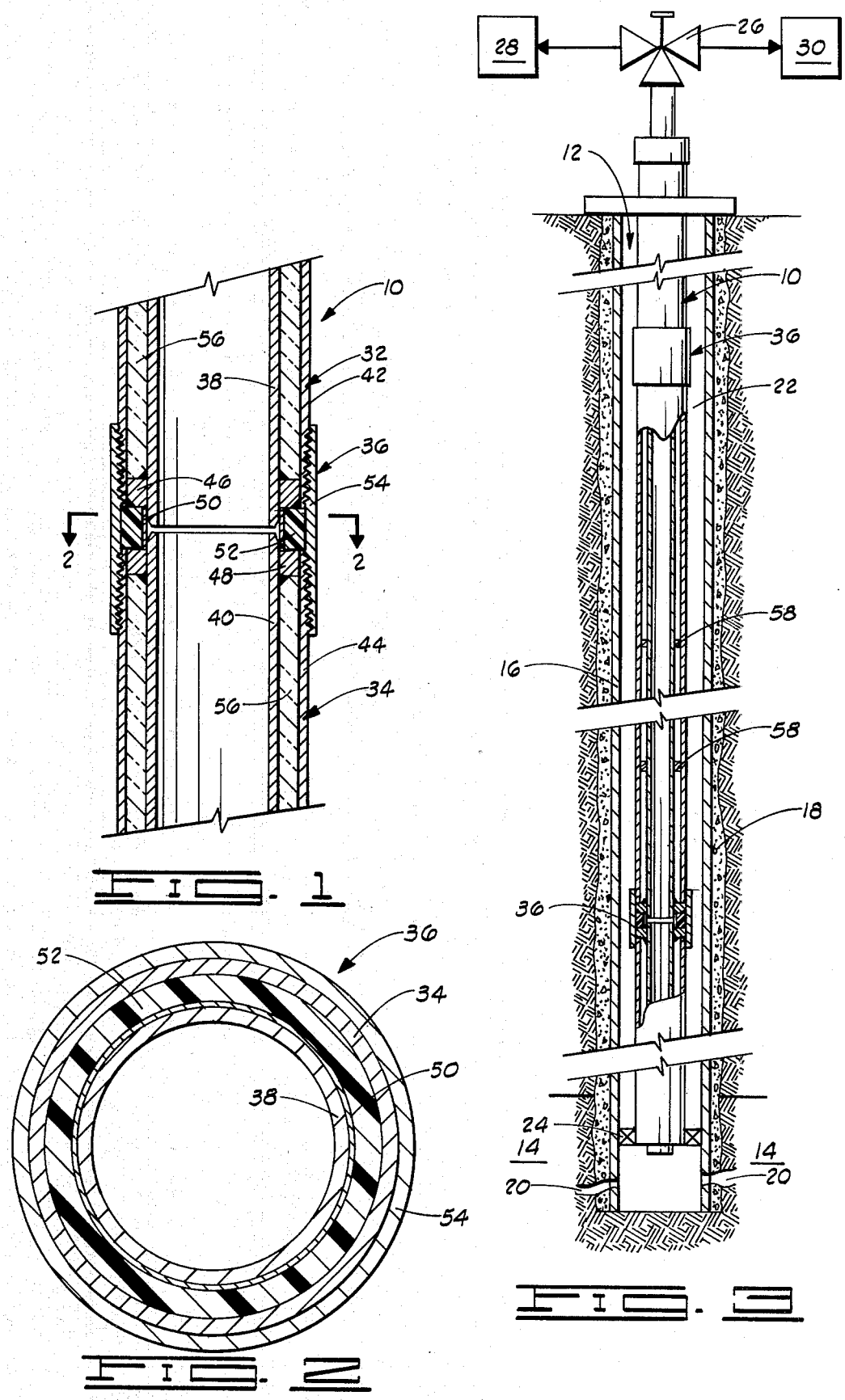

INSULATED PRESTRESSED CONDUIT STRING FOR HEATED FLUIDS

BACKGROUND OF THE INVENTION

1. Field of the Invention

The present invention relates to insulated prestressed conduit strings for conducting heated fluids, and more particularly, but not by way of limitation, to an improved such conduit string formed of concentric double tube conduit sections formed together by connector means which result in high strength insulated joints.

2. Description of the Prior Art

Insulated prestressed conduit strings for conducting heated fluids through well bores comprised of a plurality of concentric double tube conduit sections and methods of constructing and assembling such conduit sections have been developed and used heretofore. For example, U.S. Pat. No. 3,511,282 to G. P. Willhite et al. discloses a conduit assembly for conveying heated fluids comprised of a plurality of concentric double tube conduit sections wherein the inner fluid conductor tube is in tension prestress and the outer tube is in compression prestress. The double tube construction of the conduit sections reduces heat loss from heated fluids conducted through the conduit assembly and the prestress condition of the tubes prevents or eliminates expansion and deformation of the assembly when heated.

U.S. Pat. No. 3,654,691 to G. P. Whillhite et al. teaches a process for constructing conduit sections of the type described above. U. S. Pat. No. 3,608,640 teaches a method of assembling a prestressed conduit in a well.

A problem encountered in the use of the insulated prestressed conduit assemblies used heretofore is that the construction of the double tube conduit sections has been such that a reduction in mechanical strength of the sections is produced at the joined ends of the sections which brings about serious limitations in the ability of the sections to be repeatedly installed in and removed from well bores. More specifically, in one design, the inner small diameter conductor tubes are connected at the joints by couplings and the outer tubes of the sections are left unconnected. This leaves a length of smaller diameter tubing between each section which is of reduced mechanical strength as compared to the double wall portions of the sections and which is uninsulated. The uninsulated portions of the conduit string allow a high rate of heat transfer from heated fluids flowing within the string thereby partially defeating the purpose of using an insulated conduit string in the well bore. Further, as indicated above, the connected-together small diameter portions of the conduit string have reduced mechanical strength as compared to the double-walled portions of the string.

In another design, the outer larger diameter tubes of each conduit section are connected together by couplings thereby eliminating the high heat transfer problem at the joints mentioned above, but the portions of the outer tubes of the conduit sections which are connected together at the joints are attached to bushings which are in turn attached to the inner tubes of the sections at a distance from the joints whereby the strength of the joints is limited to the strength of the outer tubes only.

By the present invention an improved insulated prestressed conduit string for conducting heated fluids through a well bore is provided which obviates the problems mentioned above and has a greater resistance to wear and tear during reuse of the conduit string.

SUMMARY OF THE INVENTION

An improved insulated prestressed conduit string for conducting heated fluids through a well bore comprised of a plurality of concentric double tube conduit sections each including a heated fluid conductor tube in tension prestress and a larger diameter outer tube in compression prestress. The larger diameter outer tube is shorter than the conductor tube whereby the ends of the conductor tube extend short equal distances beyond the ends of the outer tube. Bushing means are positioned at the ends of the outer tube and are fixedly attached to and between the outer tube and the conductor tube. A plurality of connector means connecting the conduit sections together in end-to-end relationship thereby forming the conduit string are provided, each of the connector means comprising annular resilient seal means positioned around axially aligned adjacent extending ends of the conductor tubes and between adjacent bushing means of adjacent conduit sections and coupling means positioned around the seal means and connected to the outer tubes of adjacent conduit sections thereby rigidly connecting the outer tubes together and compressing the seal means against the sides of the adjacent extending ends of the conductor tubes and between the bushing means of the adjacent conduit sections thereby forming a sealed heat insulated joint between adjacent conduit sections.

It is, therefore, a general object of the present invention to provide an improved insulated prestressed conduit string.

A further object of the present invention is the provision of an insulated prestressed conduit string which is insulated throughout and which does not include portions of low mechanical strength.

A further object of the present invention is the provision of an improved insulated prestressed conduit string for conducting heated fluids through a well bore which has improved strength properties and which has improved resistance to wear and tear through repeated installation and removal of the conduit string from the well bore.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side cross-sectional view of a joint between adjacent conduit sections of the conduit string of the present invention.

FIG. 2 is a cross-sectional view taken along line 2—2 of FIG. 1.

FIG. 3 is a side cross-sectional view of a conduit string of this invention disposed in a well bore.

DESCRIPTION OF THE PREFERRED EMBODIMENTS

Referring now to the drawing, and particularly to FIG. 3, an insulated prestressed conduit string of this invention, generally designated by the numeral 10, is illustrated disposed in a well bore 12. The well bore 12 penetrates a subterranean formation 14 into which or from which a heated fluid is flowed. The well bore 12 is equipped with conventional casing 16 which is bonded to the bore hole wall in a conventional manner by a cement sheath 18. A plurality of perforations 20 communicating the formation 14 with the interior of the well bore 12 are formed in the casing 16 and cement sheath 18.

An insulated prestressed conduit string 10 is hung in the well bore 12 in a conventional manner with the lower end thereof positioned near or opposite the perforations 20. The annular space 22 between the casing 16 and the conduit string 10 can be isolated such as by means of a packer 24 positioned at the lower end of the conduit string 10.

If the well bore 12 penetrating the formation 14 is utilized as an injection well for heated fluids such as an injection well in an enhanced recovery process, heated fluids such as hot water, steam, aqueous fluids, hydrocarbon liquids, etc., are injected into the subterranean formation 14 by flowing such heated fluids into the formation by way of the conduit string 10 and a valve assembly 26 connected thereto from a source of the heated fluids 28. If heated fluids are produced from the subterranean formation 14, they flow from the formation through the perforations 20 and into the interior of the conduit string 10 by way of its open bottom end. From the conduit string 10, the heated fluids flow through the valve assembly 26 and to storage or processing facilities 30.

The flow of heated fluids through the conduit string 10 causes the conduit string 10 to be heated and a temperature differential between the conduit string 10 and the surrounding well bore to be produced. It is desirable to maintain the heat transfer from the heated fluids in conduit string 10 to the surrounding well bore as low as possible to avoid dissipation of heat from the heated fluids before they reach the formation 14 or to avoid rapid cooling of produced heated fluids. The rapid cooling of produced fluids can cause a variety of adverse results including increasing the viscosity of the fluids making them more difficult to produce or promoting precipitation of constituents of the fluids such as paraffins, etc. In addition, high heat transfer to the well bore can bring about adverse results including causing the deformation and failure of the casing 16 and causing the rapid deterioration of the cement sheath 18 surrounding the casing.

The heating of the conduit string 10 caused by flowing heated fluids therethrough causes the conduit string 10 to tend to expand. If a conventional conduit string formed of single sections of tubing is utilized, the conduit string will elongate because of the expansion causing the string to rise a considerable distance at the surface. While provisions can be made for the expansion of the tubing string, such as packing glands installed around the tubing at the well head and other means of allowing for expansion, such packing glands and other means are often difficult to maintain and often fail. If such a tubing string is not allowed to expand in some manner it will buckle, collapse or otherwise deform and fail.

As indicated above, a technique which has been utilized heretofore for overcoming the problems associated with expansion of tubing strings in well bores is the use of conduit sections which form the conduit string formed of concentric double tubes with the inner or heated fluid conductor tube being in tension prestress and the outer larger diameter tube being in compression prestress. The double wall prestressed construction of the conduit sections functions to insulate the conductor tube from the surrounding well bore and to reduce or eliminate expansion when heated fluids are flowed therethrough. However, as also indicated above, problems associated with mechanical strength limitations at the joints of the double wall conduit sections, high heat transfer at such joints and poor resistance to wear and tear due to repeated installation and removal of the conduit string from the well bore have been experienced. The improved insulated prestressed conduit string of the present invention obviates such problems.

Referring now specifically to FIGS. 1 and 2, the upper and lower portion of the adjoining conduit sections of the conduit string 10 are illustrated connected together by connector means of this invention. More specifically, the lower end of an upper conduit section 32 joined to the upper end of an adjacent conduit section 34 by connector means generally designated by the numeral 36 are illustrated. The conduit sections 32 and 34 are identical as are all of the conduit sections in the conduit string 10 and include an inner heated fluid conductor tube 38 and 40, respectively. The conduit sections 32 and 34 also include outer larger diameter tubes 42 and 44, respectively, which are positioned concentrically with respect to the inner tubes and which are shorter than the inner tubes by a distance such that the ends of the conductor tubes extend beyond the ends of the outer tubes by short equal distances. The particular distances that the inner conductor tubes extend beyond the ends of the outer tubes depends upon the sizes of the tubes and the geometry of the connector means 36. Generally, the inner conductor tubes should extend beyond the ends of the outer tubes so that where the conduit sections 32 and 34 are jointed together by the connector means 36, the gap between the adjacent ends of the inner conductor tubes is a few thousandths of an inch. The small gap prevents the inner conductor tubes from going into compression at the connector means and minimizes the open space between the inner conductor tubes.

The conduit sections 32 and 34 are each provided with bushings 46 and 48 positioned at opposite ends of the outer tubes 42 and 44 between the tubes 42 and 44 and the inner conductor tubes 38 and 40. As illustrated in FIG. 1, the bushings 46 and 48 are each welded to the inner conductor tubes 38 and 40 and to the outer larger diameter tubes 42 and 44. In the construction of the conduit sections, the inner conductor tubes thereof are elongated either by applying mechanical force thereto or by heating the tubes whereby they expand prior to welding the bushing at opposite ends of the sections. Once the bushings have been welded into place and the elongation of the inner conductor tubes ceased, the inner conductor tubes are in tension prestress with the outer larger diameter tubes being in compression prestress. This condition prevents the conduit sections from deforming when at low temperatures and prevents the conduit sections from deforming or expanding to a great degree when heated. As shown in the drawing, the conduit sections are positioned in longitudinal or axial alignment with the adjacent extending ends of the conductor tubes thereof facing each other.

A deflector ring 50 is positioned adjacent the outer sides of the ends of the conductor tubes 38 and 40 and an annular seal ring 52 formed of resilient material is positioned adjacent the deflector ring 50 between the surfaces of the bushings 46 and 48 facing each other. As will be understood, the deflector ring 50 prevents the seal ring from damage during assembly of the conduit section joints.

The outer end portions of the outer tubes 42 and 44 of the conduit sections 32 and 34 are provided with threads and a collar or coupling 54 having opposite threaded portions therewithin is threadedly connected to the outer tubes 42 and 44 thereby rigidly connecting the conduit sections 32 and 34 together and also compressing the resilient seal ring 52 against the deflector ring 50 and against the opposite facing surfaces of the bushing members 46 and 48. The seal ring 52 thus provides a fluid-tight seal between the conductor tubes 38 and 40 of the conduit sections 32 and 34 and functions as an insulating medium between the end portions of the conductor tubes 38 and 40 and the coupling 54.

In order to reduce the heat transfer through the conduit sections 32 and 34 and the other conduit sections in the conduit string 10, the annular spaces between the conductor and outer tubes forming the sections can be filled with a heat insulating material 56 (FIG. 1). In addition, in order to prevent the conductor tube from deforming within the outer tube of each conduit section when heated, one or more spacer members 58 (FIG. 1) can be positioned in spaced relationship within such annular spaces.

As will now be understood by those skilled in the art, because the coupling member 36 is connected to the outer larger diameter tubes of adjacent conduit sections at the points where the outer tubes are fixed to the inner conductor tubes, the joints between the conduit sections have high mechanical strength limited only by the strength of the coupling member and/or the combined strength of the inner conductor tube and the outer tube. In addition, the seal ring 52 achieves the dual function of forming a seal between adjacent conductor tubes and providing an insulating medium between the end portions of the conductor tubes and the coupling member. Because of the high mechanical strength of the joints of the conduit string 10 and the high stength of the end portions of the conduit sections, the conduit string 10 has a high resistance to wear and tear and other damage through repeated installation and removal from well bores.

While numerous changes in the construction and arrangement of parts of the present invention will suggest themselves to those skilled in the art, such changes are encompassed within the spirit of this invention as defined by the appended claims.

The embodiment of the invention is which an exclusive property or privilege is claimed are defined as follows:

1. An improved prestressed conduit string for conducting heated fluids through a well bore, said conduit string being comprised of:
   a plurality of connected-together conduit sections, each conduit section comprising:
   an elongated large diameter outer tube positioned around a smaller diameter conductor tube, said outer tube being shorter than said conductor tube and being positioned with respect thereto whereby the ends of said conductor tube extend beyond the ends of said outer tube short equal distances; and
   bushing means positioned at the ends of said outer tube between said outer tube and said conductor tube, said bushing means being fixedly attached to said outer tube and to said conductor tube whereby said conductor tube is in tension prestress and said outer tube is in compression prestress;
   said conduit sections being connected together in end-to-end relationship to thereby form said conduit string by connector means, each of said conductor means comprising:
   annular resilient seal means positioned around axially aligned adjacent extending ends of said conductor tubes and between adjacent bushing means of adjacent conduit sections; and
   coupling means positioned around said seal means and connected to the outer tubes of said adjacent conduit sections thereby rigidly connecting said conduit sections together and compressing said seal means against the sides of said adjacent extending ends of said conductor tubes and between said bushing means of said conduit sections thereby forming a heat insulated sealed joint between said adjacent conduit sections.

2. The conduit string of claim 1 wherein said conductor tubes and outer tubes of each of said conduit sections are positioned concentrically with respect to each other.

3. The conduit string of claim 2 wherein each of said conduit sections is further characterized to include one or more annular spacer members positioned between the conductor tube and outer tube thereof and between said bushing means thereof.

4. The conduit string of claim 1 wherein each of said conduit sections is further characterized to include heat insulation material positioned in the annular space between said conductor tube and outer tube thereof.

5. The conduit string of claim 4 wherein said bushing means of each of said conduit sections are welded to said conductor tube and outer tube thereof and said coupling means are threadedly connected to said outer tubes of said adjacent conduit sections.

6. The conduit string of claim 1 wherein said connector means are each further characterized to include an annular deflector ring means positioned between the sides of said adjacent extending ends of said conductor tubes and said annular resilient seal means.

7. In an insulated prestressed conduit string for conducting heated fluids through a well bore, said conduit string being comprised of a plurality of concentric double tube conduit sections each including an inner heated fluid conductor tube in tension prestress and a larger diameter outer tube in compression prestress, the improvement which comprises:
   said outer tubes of said conduit sections being shorter than said conductor tubes thereof whereby the ends of said conductor tubes extend short equal distances beyond the ends of said outer tubes;
   bushing means positioned at the ends of said outer tubes and fixedly attached to and between said conductor tubes and said outer tubes; and
   a plurality of connector means connecting said conduit sections together in end-to-end relationship thereby forming said conduit string, each of said connector means comprising:
   annular resilient seal means positioned around axially aligned adjacent extending ends of said conductor tubes and between adjacent bushing means of adjacent conduit sections; and
   coupling means positioned around said seal means and connected to the outer tubes of said adjacent conduit sections thereby rigidly connecting said conduit sections together and compressing said seal means against the sides of said adjacent extending ends of said conductor tubes and between said bushing means of said adjacent conduit sections thereby forming a sealed heat insulated joint between said adjacent conduit sections.

8. The conduit string of claim 7 wherein each of said conduit sections is further characterized to include one or more annular spacers positioned between said conductor and outer tubes thereof and said bushing means thereof.

9. The conduit string of claim 8 wherein said bushing means of each of said conduit sections are welded to said conductor tube and outer tube thereof and said coupling means are threadedly connected to said outer tubes of said adjacent conduit sections.

10. The conduit string of claim 9 wherein said connector means are each further characterized to include annular deflector ring means positioned between the sides of said adjacent extending ends of said conductor tubes and said annular resilient seal means.

* * * * *